(12) United States Patent
Majdoub et al.

(10) Patent No.: US 10,712,214 B2
(45) Date of Patent: Jul. 14, 2020

(54) METHOD FOR MONITORING THE UPTHRUST OF A SUBSEA PIPELINE BUOY

(71) Applicant: SAIPEM S.A., Montigny le Bretonneux (FR)

(72) Inventors: Taoufik Majdoub, Bobigny (FR); François-Régis Pionetti, La Baleine (FR); Axel Sundermann, Fontenay-les-Briis (FR); Jalil Agoumi, Le Kremlin-Bicetre (FR)

(73) Assignee: Saipem S.A., Montigny le Bretonneux (FR)

( * ) Notice: Subject to any disclaimer, the term of this patent is extended or adjusted under 35 U.S.C. 154(b) by 0 days.

(21) Appl. No.: 16/343,354

(22) PCT Filed: Oct. 18, 2017

(86) PCT No.: PCT/FR2017/052869
§ 371 (c)(1),
(2) Date: Apr. 18, 2019

(87) PCT Pub. No.: WO2018/073539
PCT Pub. Date: Apr. 26, 2018

(65) Prior Publication Data
US 2019/0242763 A1 Aug. 8, 2019

(30) Foreign Application Priority Data
Oct. 21, 2016 (FR) ...................................... 16 60254

(51) Int. Cl.
*G01L 1/24* (2006.01)
*E21B 17/01* (2006.01)

(52) U.S. Cl.
CPC ............ *G01L 1/242* (2013.01); *E21B 17/012* (2013.01)

(58) Field of Classification Search
None
See application file for complete search history.

(56) References Cited

U.S. PATENT DOCUMENTS

2004/0035216 A1 2/2004 Morrison
2006/0233485 A1* 10/2006 Allen ........................ F17D 5/00
385/13

(Continued)

FOREIGN PATENT DOCUMENTS

GB 2533123 6/2016
WO WO 2009/158630 12/2009

(Continued)

*Primary Examiner* — Jerry Rahll
(74) *Attorney, Agent, or Firm* — Cozen O'Connor

(57) ABSTRACT

A method of monitoring variation in the thrust exerted by at least one buoy exerting traction on an undersea pipe, wherein: 1) the deformation of at least one optical fiber is measured by measuring variation of an optical signal in said fiber extending on the surface or embedded securely in the bulk of at least one of the following support elements: a) the buoy; b) at least a portion of: b1) the length of the tubular wall of the pipe or b2) an anticorrosion coating or a thermally insulating material fastened on the surface of said pipe, on which said buoy exerts traction, and c) an abutment part secured to said pipe or buoy, and on which said buoy exerts said thrust; 2) a variation of said thrust exerted by said buoy is determined as a function of said variation of the optical signal.

17 Claims, 5 Drawing Sheets

(56) References Cited

U.S. PATENT DOCUMENTS

Figure 1:
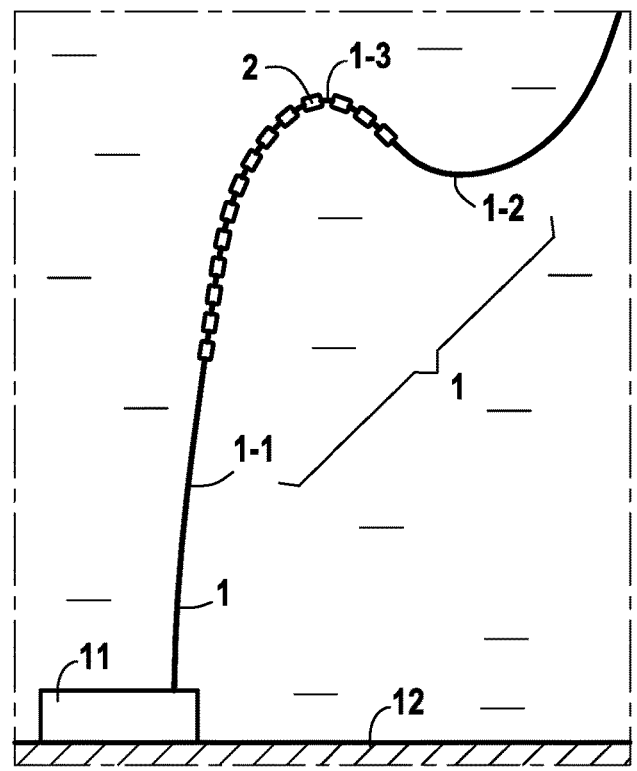

2011/0292384 A1   12/2011   Ramos
2014/0338918 A1   11/2014   Millheim
2016/0084065 A1    3/2016   Deberry
2016/0161350 A1    6/2016   Balasubramaniam

FOREIGN PATENT DOCUMENTS

WO   WO 2013/098546   7/2013
WO   WO 2014/016784   1/2014

* cited by examiner

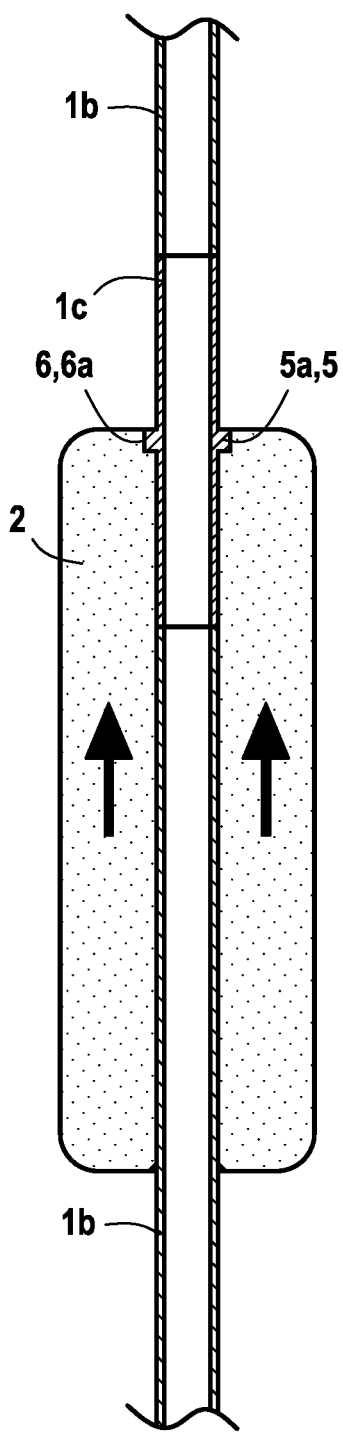
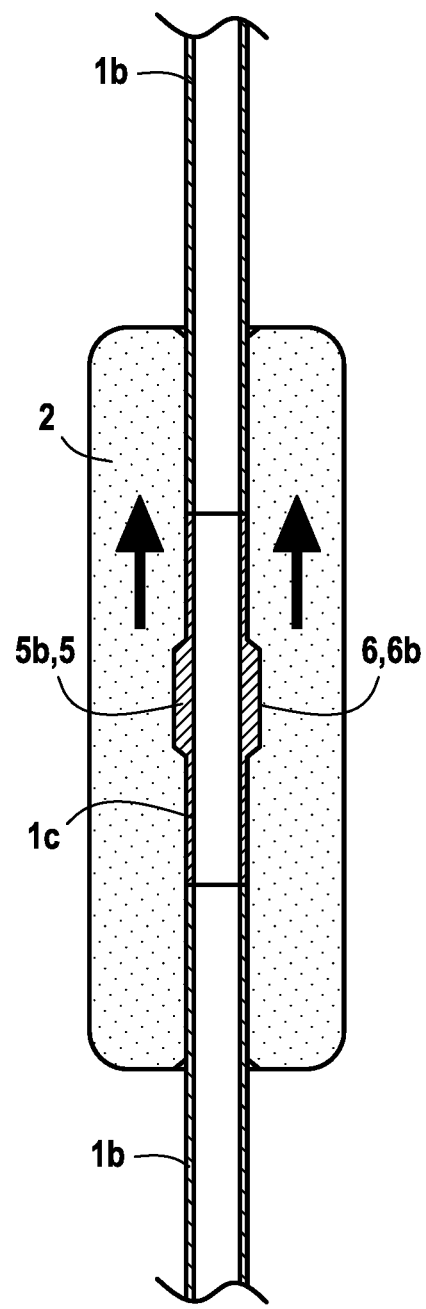
FIG.2A
FIG.2B

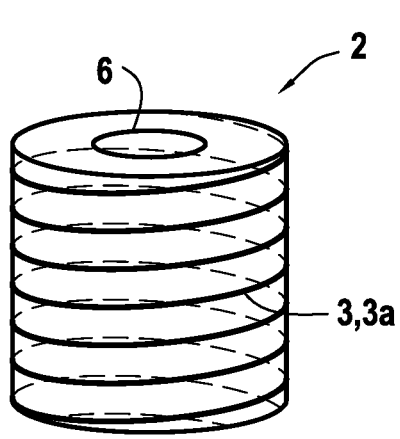
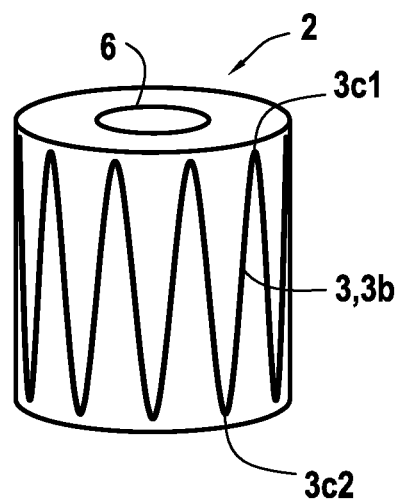
FIG.3A  FIG.3B
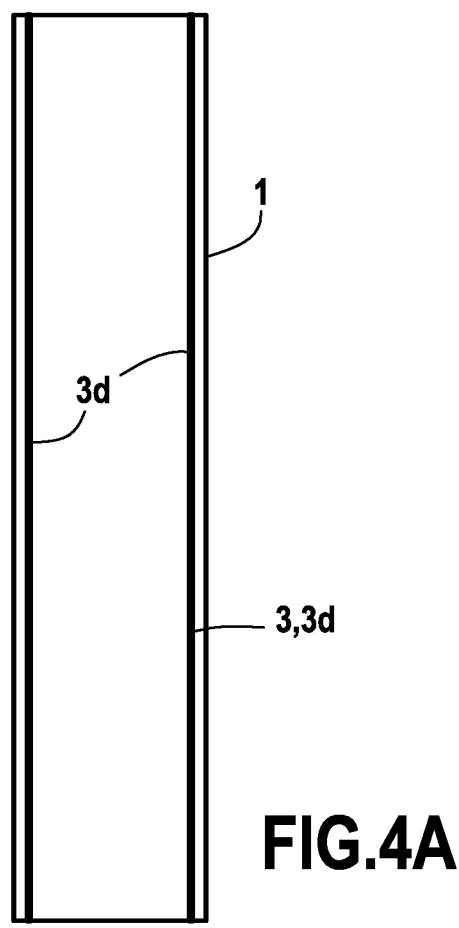
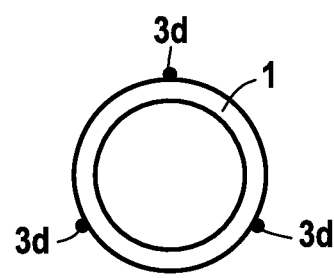
FIG.4A  FIG.4B

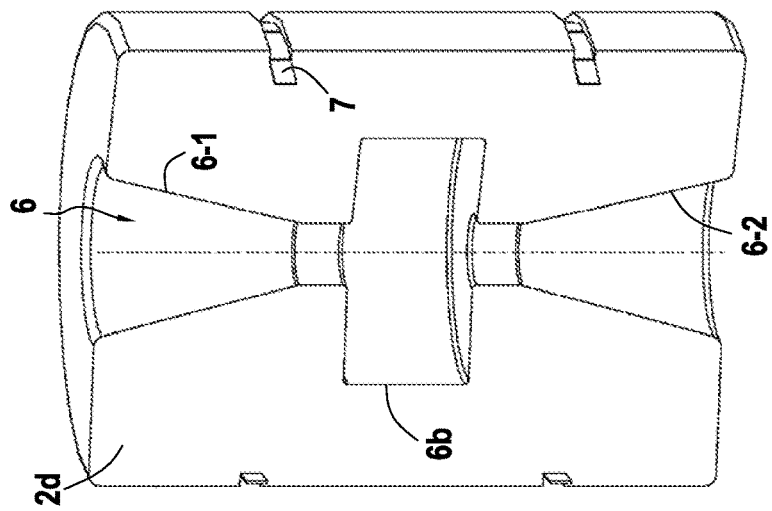
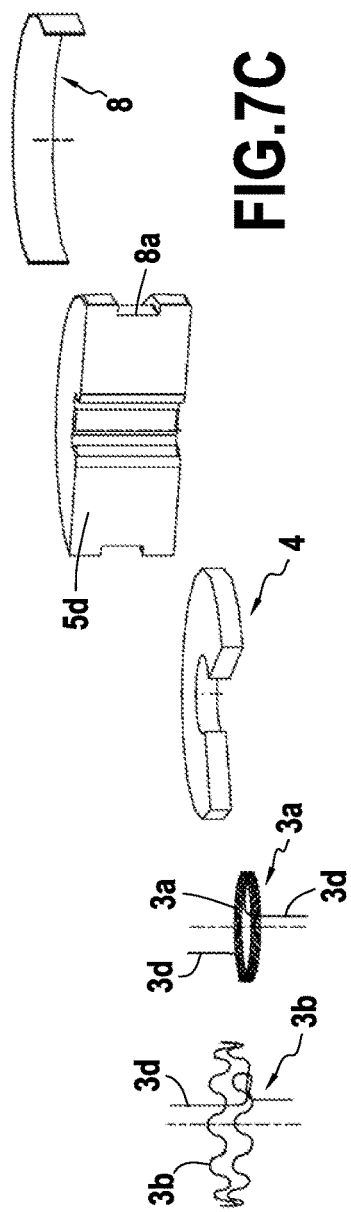
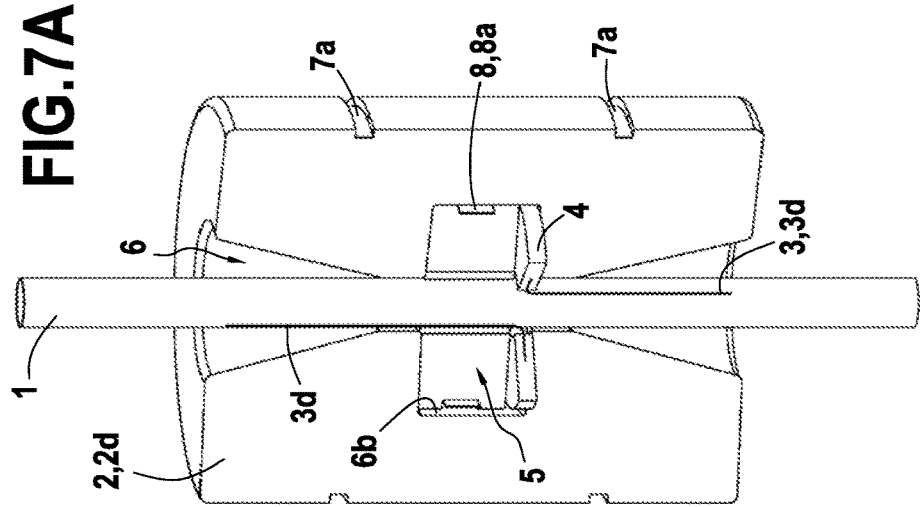

METHOD FOR MONITORING THE UPTHRUST OF A SUBSEA PIPELINE BUOY

PRIORITY CLAIM

This is a U.S. national stage of application No. PCT/FR2017/052869, filed on Oct. 18, 2017. Priority is claimed on France Application No. FR1660254, filed Oct. 21, 2016, the content of which is incorporated here by reference.

BACKGROUND OF THE INVENTION

The present invention relates to the general field of undersea pipes for transporting fluids by providing a bottom-to-surface connection for transferring hydrocarbons, e.g. oil and gas, coming from undersea production wells. More particularly, the present invention relates to the general field of undersea transport pipes, either of the rigid pipe type known as steel catenary risers (SCRs), or else of the flexible pipe type.

Undersea pipes for transporting fluids are commonly used in the offshore production of hydrocarbons. Thus, in an offshore production field there are generally a plurality of wells in operation, which wells may be spaced apart from one another by several kilometers, or even tens of kilometers. The fluids coming from the various wells need to be collected by pipes laid on the sea bottom and they need to be transferred by bottom-to-surface connection pipes from an undersea pipe resting on the sea bottom to a surface installation that collects them, e.g. on a ship or at a collection point situated on shore.

The invention relates more particularly to pipes that are fitted with floats or buoys that are immersed along at least a portion of the pipe in order to provide tensioning between the bottom and the surface so as to exert permanent tension on the pipe for holding the bottom-to-surface connection pipe in position, possibly in a vertical position.

More particularly, use is made of buoys that surround the pipe coaxially. Typically, a buoy module is generally cylindrical in shape, being hollow or solid, and being constituted by one or more portions, in particular two half-buoys, that, once they have been assembled together, form a cylindrical buoy surrounding the pipe coaxially. Still more particularly, sets of buoys are used that are arranged in a string along at least a portion of the pipe.

Generally, the buoys used for undersea fluid transport pipes in the offshore production of hydrocarbons are made of foam, e.g. of syntactic polypropylene (PP) or polyurethane (PU).

Since those undersea installations and equipment remain under water at great depths for long durations (20 years and more), installed buoys must also satisfy high mechanical stress requirements in order to withstand pressure at the sea bottom. Specifically, since the pressure of water is substantially 0.1 megapascals (MPa), i.e. about 1 bar, for a depth of 10 meters (m), the pressure that undersea pipes need to withstand is then about 10 MPa, i.e. about 100 bars, for a depth of 1000 m, and about 30 MPa, i.e. about 300 bars, for a depth of 3000 m.

Unfortunately, experience shows that such buoys deteriorate over time. Furthermore, deterioration of an underwater buoy leads to a reduction in its buoyancy, and thus in the thrust exerted by the buoy, which may be associated with deterioration of the buoyancy material constituting the buoy and/or with a change in the volume of the buoy, resulting from the pressure to which the buoy is subjected, in particular at great depth. For buoys based on syntactic foam, this deterioration of the buoy may be due to water infiltrating into the buoy, leading to hydrolysis of the glass beads contained in the buoy.

Optical fiber deformation measurement systems are known, e.g. for measuring curvature deformation or length deformation. With a Bragg grating fiber, a light beam is injected into the fiber, and a wave is reflected by each Bragg grating, with the wavelength of the reflected wave depending on the pitch of the grating and on the refractive index of the core of the fiber. With gratings having different pitches, it is possible to distinguish between the reflected waves. Because variation in stress and temperature affects both the refractive index and the pitch of a grating, which leads to a shift in the reflected wavelength, such a Bragg grating fiber is associated with a Raman effect type fiber for decorrelating the variation in the signal due to deformation of the fiber from the variation in the signal due to variation in temperature. For a Brillouin backscatter fiber, a light beam is injected into the fiber, with the backscattered wave being subjected to a frequency shift that depends on variation in temperature and on deformation. It is thus necessary also to associate such a fiber with a Raman effect type fiber (which measures temperature variation only), in order to decorrelate signal variation due to deformation of the fiber from signal variation due to variation in temperature. Using a laser traveling along the fiber, optical fiber deformation measurement technology serves to obtain the extent to which the fiber has lengthened and thus the deformation of the material that is in contact with the fiber. An optical fiber can measure a microdeformation and the microdeformation can be identified using Bragg gratings or using Brillouin backscattering. For a Bragg grating extension meter, when the optical fiber is subjected to deformation, the pitch of the Bragg grating (microstructure etched in the core of the fiber) changes so the way it reflects light is modified.

The object of the present invention is to provide a method for monitoring and evaluating in real time the thrust from buoys providing buoyancy to bottom-to-surface connection undersea pipes over their lifetime in order to be able to change them, should that be necessary.

US 2016/161350 describes a method of determining stresses in a support structure, specifically a pipe, on which an optical fiber is wound helically. Deformation of the fiber is measured in order to study the stresses on the pipe, but not the consequences of those stresses on potential degradation of the thrust properties of a buoy mounted on the pipe.

In WO 2009/158630, an optical fiber is used to measure the acoustic emission characteristics that result from a fluid leak in the pipe and to estimate the diameter of the orifice of the leak and its flow rate.

US 2014/338918 describes means for controlling and adjusting the buoyancy of a buoyancy chamber as a function of vertical tension variations applied on the borehole pipe in a well bored in the bottom of the sea. The buoyancy of the float is varied deliberately by adjusting the quantities of gas or of fluid contained in the float by means of ballasting and deballasting operations. For this purpose, in an implementation, a signal is measured from a load sensor arranged at an abutment against which the thrust from the float is applied (see paragraph 40, page 4, left-hand column). Nevertheless, there is no description nor suggestion of measuring the deformation of an optical fiber applied in or on an abutment part that is elastically deformable in compression in order to monitor variation in the thrust exerted by a buoy on a pipe on which it is applied, for the purpose of monitoring the state of the buoy.

WO 2014/016784 describes a method of monitoring the buoyancy of a float exerting traction on a pipe. It envisages (see paragraph 33) using an optical fiber as a strain detector, but gives no detail as to how it might be used.

US 2011/292384 describes detecting stress in the coating of a flexible pipe by using an optical fiber.

US 2016/084065, WO 2013/098546, and US 2004/035216 describe sensors for measuring various parameters including tensions and vibration by using an optical fiber applied on a riser, but without mentioning nor suggesting measuring variation in thrust from a buoy mounted on said pipe.

The present invention provides a method of monitoring variation over time in the thrust exerted by at least one buoy mounted on an undersea bottom-to-surface connection pipe and exerting traction on said pipe, the method being characterized in that the following steps are performed:

1) measuring the deformation of at least one optical fiber by measuring variation of an optical signal in the optical fiber relative to a reference value for the optical signal, said optical fiber extending at least in part in a direction having a component parallel to the direction of the thrust force exerted by said buoy on said pipe, said optical fiber being securely applied against the surface, preferably by adhesive, or preferably being securely embedded in the bulk of a material constituting at least an abutment part secured to said pipe or to the buoy and against which said buoy exerts said thrust, said abutment part being an elastically deformable intermediate abutment part arranged between i) a portion of the buoy and ii) a rigid retaining part secured to said pipe, the thrust exerted by said buoy comprising said intermediate abutment part; and 2) determining a variation in said thrust exerted by said buoy as a function of said variation of the optical signal as measured in step 1) relative to a value for the optical signal corresponding to a maximum initial thrust from the buoy.

In particular, said reference value of the optical signal is the initial value measured when the pipe has just been laid at sea, since it is at that moment when buoyancy thrust is at a maximum. All other measurements are compared with this initial state.

In practice, and by way of illustration, it may be found necessary to replace a buoy if its thrust decreases by 20% (thus if there is a corresponding determined variation in the measurement of the optical signal).

It can be understood that said optical fiber is connected to an optical fiber that may be integrated in an umbilical for conveying the optical signal, preferably along the pipe, and in particular for going up to the surface and down to the bottom of the sea.

Advantageously, a calibration step may be performed in a workshop on the basis of fiber deformation measurements performed in correlation with known variations of thrust values exerted by said buoy including a said fiber, said thrust possibly being measured by mechanical means (springs) or electronic means (strain gauges).

More particularly, in step 1), the deformation of at least one optical fiber is measured by using at least Brillouin backscattering or a Bragg grating optical fiber, by measuring variation in the frequency of the backscattered wave or respectively variation in the wavelength of the reflected wave from the optical signal reflected in the optical fiber compared with a reference value for the optical signal of the backscattered wave or respectively of the reflected wave, and preferably said optical fiber is associated with a fiber of the Raman effect type, in particular in the event of temperature variation in order to decorrelate the variation of the signal due to deformation of the fiber from the variation in the signal due to temperature variation.

In practice, this measurement of variation in buoyancy thrust is made possible since the materials used as materials for constituting buoys, namely synthetic materials based on PP or PU, preferably syntactic foam, or steel for pipes (themselves made of steel) may be subjected to deformation for the levels of thrust applied to the pipe by a buoy or a set of buoys, which are typically in the range 0.5 tonnes (t) to 5 t, and at these levels of thrust, the deformation of said materials constituting the buoys or their compressed abutment parts, or the deformation of the pipe in traction remains less than the maximum deformation acceptable for the optical fiber, typically around 1% in traction and 10% in compression. However, this problem can be avoided by using a fiber that is laid in non-rectilinear manner, e.g. as a helix, as described below. Thus the way the fiber is laid can be adapted to the material. If the material is rigid and lengthens less than the fiber, a fiber that is laid in a straight line can function. If the material is very deformable, and if it deforms more then the fiber, than the fiber cannot be laid in a straight line, but must be laid as a helix, for example.

If the optical fiber is applied on or in a support element constituted by an elastic material for said abutment part, said fiber is deformable in compression like the support elements in question.

It should be observed that the float is subjected in significant manner to swell, to current, and to movement of the float only if its depth is less than 50 m. Furthermore, and in any event, such dynamic stresses and the variations in their components along the thrust axis of the float are fast, so they can easily be filtered out and reveal only the deformation of the fiber and of the support that is caused by variation in the thrust from the buoy, which variation is much slower.

Preferably, said optical fiber is arranged in or at the surface of a said abutment part, which is an elastically deformable intermediate abutment part, made of elastomer material, said buoy being pressed against the initially compressed intermediate part, and a reduction in the thrust from the buoy over time is determined by elastic expansion of said intermediate part resulting from a decrease in the compression and a variation in the volume of the intermediate abutment part, said buoy being made of a buoyant material that is more rigid than the material of the intermediate abutment part and that is not subjected to elongation deformation in the event of degradation giving rise to a decrease in the thrust exerted by said buoy.

It can be understood that the rigid retaining part serves to hold said abutment part against movement in translation and thus to hold said buoy.

In this implementation, the buoy is pressed against the initially compressed intermediate part, and the intermediate part becomes less and less compressed over time when there is a reduction in thrust from the buoy over time. This implementation in which the optical fiber is adhesively bonded on the surface or is embedded in the bulk of an intermediate abutment part made of elastomer material is particularly advantageous since an elastomer material, even when of small size having thickness in the range 5 mm to 50 mm in the vertical direction, serves to make it possible to detect a reduction of thrust by elastic expansion of said intermediate part resulting from the reduction in compression and variation in the volume of the intermediate abutment part under circumstances in which a more rigid buoyant material, such as the material constituting the buoy, would not be subjected to variation in volume or the steel of the pipe would not be subjected to elongation deformation, thereby not enabling a variation in thrust to be detected. In particular, it can happen that the syntactic foam of the buoy loses buoyancy by degradation of the foam and of the glass beads that it contains, but without any variation in volume as a result of the foam and the glass being replaced by the surrounding water as a result of porosity.

More particularly, said buoy is of part cylindrical or pseudo-cylindrical shape arranged coaxially around the pipe.

This type of buoy is generally secured to the pipe by friction from clamping collars. The number of buoys and their positions along the pipe may vary depending on the installation and may depend on the method used for laying, on depth, and on the type of pipe that is to be laid.

More particularly, a said central cavity in the buoy having the pipe passing therethrough presents a wall portion of shape complementary to the shape of said rigid retaining part and suitable for blocking movement in translation of the buoy in the longitudinal direction of the pipe.

In a particular implementation, said rigid retaining part is constituted by a top peripheral collar made of steel surrounding said pipe and serving to hold in position said buoy arranged coaxially around the pipe and under said collar, said intermediate abutment part of annular shape being arranged coaxially against the underface of said rigid retaining part.

In this implementation, the assembly of said collar and said intermediate abutment part of annular shape arranged coaxially against the underface of said rigid retaining part can co-operate with a complementary hollow shape in an inside surface of a central cavity of said buoy that faces the outside surface of the pipe.

In this implementation, said buoy (or a plurality of buoys in series) may be slidably mounted around the pipe, being blocked against moving in translation by the collar that transmits thrust from the buoys to the pipe.

In another particular implementation, said rigid retaining part is constituted by a bottom peripheral collar made of steel surrounding said pipe and serving to hold in position said buoy arranged axially around the pipe and above said collar, said intermediate abutment part of annular shape being arranged coaxially against the underface of said rigid retaining part.

In this implementation, said buoy may be fastened to said pipe by a clamping element at its bottom end, which element is pressed against an underface of said compressed abutment part.

In another particular implementation, said rigid retaining part is constituted by a steel shoulder at the surface of the pipe, with the assembly of said shoulder and of said intermediate abutment part of annular shape arranged coaxially against the underface of said rigid retaining part co-operating with a complementary hollow shape in an inside surface of the central cavity of said buoy facing the outside surface of the pipe, said shoulder serving to hold in position said buoy arranged coaxially around the pipe and said shoulder.

An arbitrary distinction is made herein between a "shoulder" and a "collar" in that firstly a shoulder is a radial projection that extends over a greater distance in the longitudinal direction of the pipe or the coaxial buoy and secondly the buoy surrounds a shoulder completely.

Said shoulder may be a radial projection made integrally with the surface of the pipe or fitted onto the surface of the pipe using clamping elements, in particular in the form of two fitted semicylindrical retaining half-parts that are fastened one against the other and against the pipe by a belt or a clamp.

It can be understood that the buoy cannot move in translation or slide axially beyond the shoulder or collar, and the thrust force from the buoy is transmitted to the pipe via a bearing surface of the shoulder or collar, and possibly via the outside surface of the pipe facing a clamping element for clamping the buoy against the pipe.

More particularly, said collar or shoulder may extend in continuous or discontinuous manner circularly around the pipe with a thickness in the range 5 millimeters (mm) to 50 mm from the surface of the pipe.

Still more particularly, said collar or shoulder may be arranged in association with a forged junction part providing the welded junction between two unit pipe elements of said pipe.

In a variant implementation, the fiber extends helically and coaxially on the surface of or inside said support element. This implementation in which the optical fiber is arranged in a helix is preferable since a helical lay imparts curvature to a fiber enabling it to accept greater deformation of said support element and more particularly of the deformable part, and it makes it possible to use a single fiber. The deformation of the optical fiber in the axial direction of the thrust is reduced by a factor that corresponds to the cosine of the pitch angle of the helix.

In a variant implementation, the optical fiber extends sinusoidally or in undulations or as a zigzag around at least a portion of the circumference and preferably the entire circumference on the surface of or inside said support element.

It can be understood that the amplitude axis of the sinusoid or of the undulations corresponds to the axis of the buoy and of the pipe, and the axis of the period of the sinusoid is circular. This implementation using a sinusoidal arrangement of the optical fiber is also advantageous since the sinusoidal lay also imparts curvature to the fiber enabling it to accept greater deformation of said support element and more particularly of the deformable part, and it makes it possible to use a single fiber.

In a variant implementation, the optical fiber extends over a toroidal surface, preferably by winding the fiber on an imaginary torus or on a toroidal support of diameter smaller than the thickness of said support element, and preferably situated in said intermediate abutment.

In a variant embodiment, a plurality of optical fibers are used that extend in rectilinear manner in said coaxial direction of said support element.

More particularly, a plurality of rectilinear optical fibers are used that are arranged regularly around the circumference of said support element comprising said buoy, or preferably the surface of the pipe.

In this implementation, the plurality of fibers is advantageous for detecting deformation over the entire periphery or circumference of the pipe or buoy.

The present invention also provides a bottom-to-surface connection installation suitable for use in a method of the invention, the installation being characterized in that it comprises a bottom-to-surface connection undersea pipe fitted with at least one buoy exerting traction on said pipe, and at least one optical fiber suitable for measuring deformation of the pipe by measuring variation of the optical signal in the optical fiber relative to a reference value for the optical signal, said optical fiber extending at least in part in a direction having a component parallel to the direction of the thrust force exerted by said buoy on said pipe, said optical fiber being securely applied against the surface, preferably by adhesive or being securely embedded in the bulk of a material constituting at least an abutment part secured to said pipe or to the buoy and against which said buoy exerts said thrust, said abutment part being an elastically deformable intermediate abutment part arranged between i) a portion of the buoy and ii) a rigid retaining part secured to said pipe, the thrust exerted by said buoy compressing said intermediate abutment part; and said optical fiber is connected to an optical fiber conveying the optical signal, in particular in an umbilical containing an optical fiber, preferably along the pipe.

More particularly, said installation comprises a plurality of said buoys of part cylindrical or pseudo-cylindrical shape arranged one after another or spaced apart in a string coaxially around the pipe, and at least one optical fiber for measuring the respective thrusts from each of the buoys, preferably a single optical fiber for all of the buoys.

More particularly, the or each buoy is constituted by a plurality of buoy elements, preferably in the form of two buoy half-modules of semicylindrical shape suitable for being arranged facing each other so as to surround the pipe.

More particularly, at least one optical fiber is arranged in or at the surface of a said elastically deformable intermediate abutment part that is of annular shape and made of elastomer material, the thrust exerted by said buoy compressing said intermediate abutment part, said portion of said central cavity of the buoy presenting a shape that is complementary to the shape of the assembly of said abutment part and said rigid retaining part suitable for blocking movement of the buoy in translation along the longitudinal direction of the pipe.

More particularly, said buoy is applied against the initially compressed intermediate part, said buoy being made of a buoyant material that is more rigid than the material of said intermediate abutment part and that is not deformed in elongation in the event of degradation that gives rise to a decrease in the thrust exerted by said buoy.

Preferably, the optical fiber(s) of various support elements of a plurality of buoys in series or in a string is/are connected in series and to a common umbilical for transmitting optical signals to an optical signal transceiver and measuring device that is preferably at the surface.

In this embodiment, knowing the return time of the signal, and on the basis of the speed of light, it is possible to determine the position of a deformation and thus the fiber or fiber portion that has been deformed, and thus which buoy has been degraded.

In another embodiment, the optical fiber(s) of the various support elements of a plurality of buoys in series or in a string is/are not connected in series, being suitable for connecting to different umbilicals for transmitting optical signals.

Alternatively, if each buoy support element has its own fiber or its own fiber network not connected in series between the various buoys, it suffices to make connections in turn with an umbilical and the optical fiber(s) of each of the support elements.

Advantageously, the buoyancy material of the buoy may be a material that also presents thermal insulation properties, such as syntactic foam.

Figure 2:
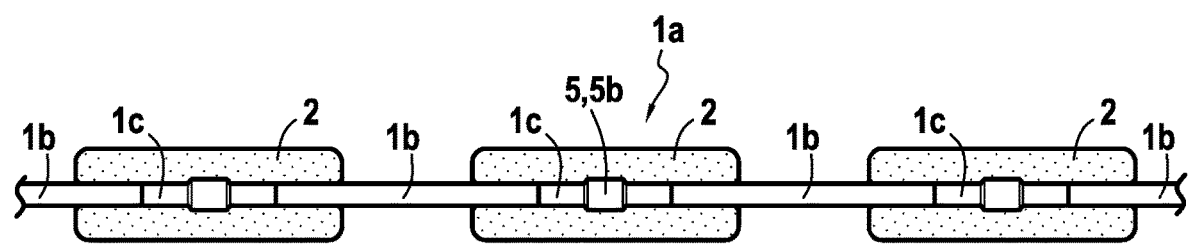
Figure 5A:
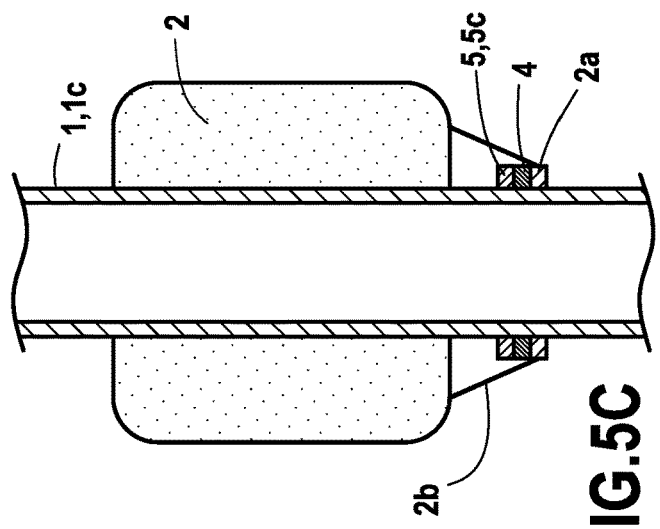
Figure 5B:
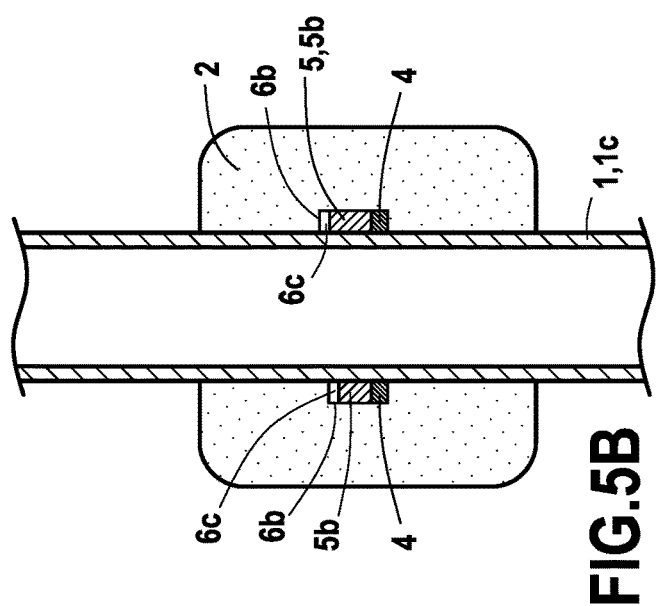
Figure 5C:
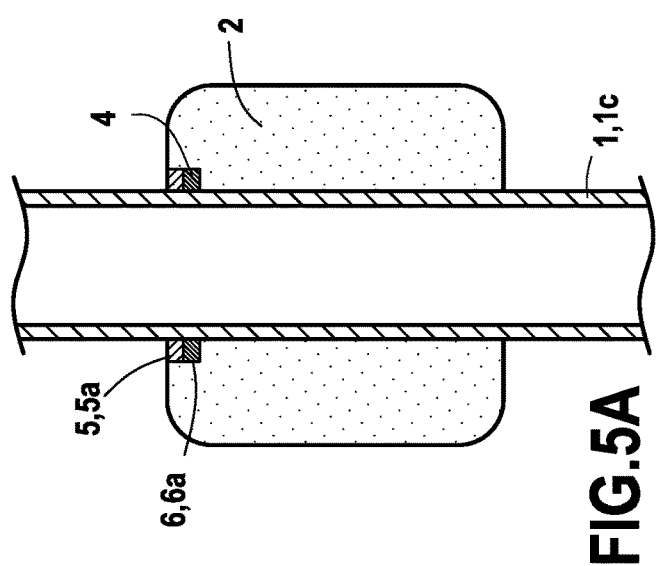
Figure 6A:
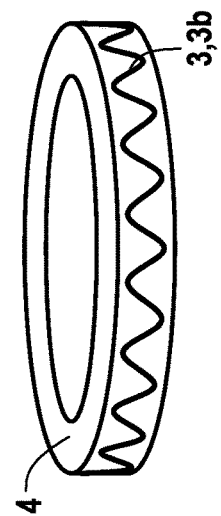
Figure 6B:
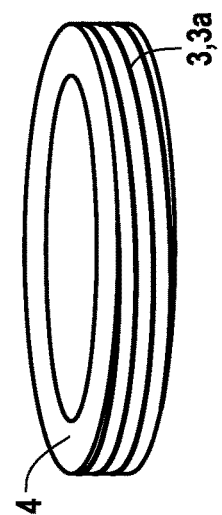

Other characteristics and advantages of the present invention appear from the following description made with reference to the accompanying drawings, which show an embodiment having no limiting character. In the figures:

FIG. 1 is a diagrammatic view of an undersea bottom-to-surface connection pipe 1 fitted with a plurality of buoys 2 in a string to which the monitoring method of the invention is applied;

FIG. 2 is a diagrammatic view of a set 1a of unit undersea pipe elements 1b connected together by tubular junction elements 1c and provided with three buoys 2:

FIGS. 2A and 2B show two variant embodiments of a tubular junction element 1b, one of them (FIG. 2A) having a peripheral collar 5a, and the other one (FIG. 2B) having a peripheral shoulder 5b all around the circumference of the outside surface of said tubular junction element 1c for fastening a buoy on a pipe against the collar 5a at one end of the buoy (FIG. 2A), and around and against the shoulder 5b in a cylindrical portion 6b of the surface of the axisymmetric central internal cavity 6 in the buoy (FIG. 2B);

FIGS. 3A and 3B are diagrammatic views showing the arrangement of an optical fiber 3 on the outside surface of a buoy 2 in a helical arrangement 3a (FIG. 4a) or a sinuosoidal arrangement 3b (FIG. 4B);

FIGS. 4A and 4B are diagrammatic views showing the arrangement of a plurality of optical fibers 3 on the outside surface of a buoy 2 in a rectilinear arrangement 3d in side view (FIG. 4A), and in cross-section (FIG. 4B);

FIGS. 5A, 5B, and 5C are diagrammatic views showing a buoy 2 fastened on a pipe 1 against a rigid retaining part 5 via an intermediate abutment part 4 subjected to the thrust from the buoy, said intermediate abutment part 4 of annular shape being arranged between a bearing surface of a portion of the buoy and a) a top collar 5a (FIG. 5A), b) a shoulder 5b (FIG. 5B), or c) a bottom collar 5c (FIG. 5C);

FIGS. 6A and 6B are diagrammatic views of an intermediate abutment part 4 with an optical fiber on its outside surface in a helical arrangement 3a (FIG. 6A) or a sinuosoidal arrangement or an undulating arrangement or a zigzag arrangement 3b (FIG. 6B); and FIGS. 7A to 7C are diagrammatic partially exploded section views of a buoy with an intermediate abutment part 4 of annular shape at the underface of a middle peripheral retaining part 5 that is fastened around the pipe (FIG. 7A), and with a cylindrical hollow shape 6b of the axisymmetrical central internal cavity 6 of the buoy (FIG. 7B), and a retaining half-part 1c, an abutment part 4, and an optical fiber 3a or 3b that are not integrated therein (FIG. 7C).

DETAILED DESCRIPTION OF THE INVENTION

The invention applies to any bottom-to-surface undersea pipe that needs the pipe to be tensioned, in particular a pipe providing transport between equipment 11 co-operating with undersea hydrocarbon production wells, in particular producing oil and gas, and a surface installation, such as the undersea pipe 1 shown in FIG. 1.

The undersea pipe 1 shown in FIG. 1 is of the type constituted by a rigid pipe portion 1-1 comprising a single steel tube extending from equipment 11 on the sea bottom 12 to the subsurface, where it is connected 1-3 to the end of a flexible pipe portion 1-2 that rises to the surface while forming a dipping double catenary. This type of pipe is tensioned by strings of floats in the form of coaxial cylindrical buoys 2 mounted around the pipe over a fraction of its length.

Furthermore, the portion of rigid undersea pipe 1-1 may be a coaxial pipe of the pipe-in-pipe (PIP) type, i.e. each unit pipe element 1b or 1c comprises an inner steel tube for transporting the hydrocarbons from the production well, and an outer steel tube coaxial with the inner tube and referred to as the "outer jacket", which may be covered in an anticorrosion coating that is directly in contact with the surrounding water.

The rigid pipe portions 1-1 are typically assembled together by welding together strings or sets of unit pipe elements 1a that are assembled on land, comprising a plurality of unit pipe sections 1b having a length in the range 10 m to 100 m, depending on the holding capacity of the laying system. A commonly used term is "joints", in particular "quadruple joints" ("quadjoints") for a string of four unit pipe elements assembled together, as shown in FIG. 2. These strings 1a of unit elements 1b are connected to one another on board the ship progressively while they are being laid at sea.

Under all circumstances, the buoy needs to transmit its traction force against a bearing surface that is secured to the pipe, and this may be done locally either by clamping onto the outside surface of the pipe or by blocking against the surface of a rigid retaining part 5 that is secured to the pipe and that takes up the thrust force in order to transmit it to the pipe.

It is thus possible to make use of a plurality of means for fastening coaxial cylindrical buoys 2 around a pipe 1, and in particular:

the buoy 2 may be fastened by friction against the outside surface of the pipe by a clamping element that is suitable for rigid pipes made of steel or for flexible pipes; or the buoy may be blocked in position by a rigid retaining part 5 that is constituted by a collar 5a, 5c or a shoulder 5b suitable for application to a rigid steel pipe as shown in FIGS. 2A and 2B, said rigid retaining part 5 optionally co-operating with an intermediate abutment part 4 as shown in FIGS. 5A-5C. Each buoy 2 is then positioned and fastened around a shoulder 5b and/or against a collar 5a or 5c and/or an intermediate abutment part 4 on the outside surface of the pipe 1.

The number and the position of buoys 2 along the pipe may vary depending on the method used for laying it, on depth, on the type of pipe that is to be laid, etc. For buoys that are fastened on a rigid pipe by means of a shoulder 5b or a collar 5a or 5c, a typical distribution comprises, by way of example, three buoys 2 for each quadjoint 1a with a shoulder 5b or a collar 5a on each tubular junction element 1c providing the junction between each unit pipe element 1b, as shown in FIG. 2 for the shoulder 5b. Under such circumstances, the cylindrical inside surface 6 forming the central cavity of the buoy 2 should preferably present a portion of its surface that is complementary in shape to the shape of the assembly comprising the rigid retaining part 5 and the intermediate abutment part 4 so as to be blocked against movement in translation along the thrust direction and axis of the buoy.

In FIG. 2A, the buoy 2 is blocked against movement in translation by a top peripheral collar 5a projecting from the surface of a tubular junction element 1c between two unit pipe elements 1b. The top portion of the cylindrical inside surface 6 has a step 6a that co-operates with the complementary shape of the collar 5a to prevent the buoy 2 from moving in translation along the vertical axis in the direction of the vertical thrust the buoy exerts on the pipe 1.

In the embodiment of FIG. 2B, the buoy 2 is prevented from moving in translation along the vertical thrust axis relative to the pipe 1b by a peripheral shoulder 5b that projects from the outside surface of a tubular junction element 1c substantially from the middle portion of the length of the inner cylindrical surface 6 of the cylindrical cavity in the buoy 2 at a setback 6b of complementary shape in the inside surface 6.

In FIGS. 3A and 3B, there can be seen two arrangements for an optical fiber 3 adhesively bonded on the surface or embedded close to the cylindrical outside surface of the buoy 2, namely a helical arrangement 3a in FIG. 3A and a sinusoidal arrangement 3b in FIG. 3B.

The helix 3a in FIG. 3A includes at least one turn, preferably at least three turns over the length (height) of the buoy. A larger number of turns and thus a smaller pitch angle for the helix increases the sensitivity of the measurement with respect to deformation of the buoy, i.e. with respect to a decrease in the length of the buoy associated with a decrease in the compression to which the buoy is subjected.

With the sinusoidal shape 3b of FIG. 3B, the portions of the fiber advantageously extend in the longitudinal axial direction of the buoy between two points, one of maximum amplitude 3c1 and another of minimum amplitude 3c2 of the sinusoid, with these longitudinal portions being close to the vertical, i.e. sloping little relative to the vertical in order to have the greatest possible number of periods of the sinusoid around the circumference of the buoy in cross-section thereof. The sinusoidal optical fiber 3b preferably extends with its maximum and minimum amplitude points 3c1 and 3c2 close to the longitudinal ends of the buoy, while the sinusoidal curve also preferably has at least four periods around the circumference of the buoy in cross-section.

In FIGS. 5A-5C and 6A-6B, there can be seen a preferred embodiment in which use is made of an intermediate abutment part 4 made of elastically deformable material such as rubber that is compressed by the thrust force exerted by the buoy. Said intermediate abutment part 4 is annular in shape and is interposed between the inside surface 6a, 6b of the central cavity 6 in the buoy and a retaining part 5 against which the abutment part 4 is fastened, the retaining part 5 being constituted by a top collar 5a in FIG. 5A, a bottom collar 5c in FIG. 5C, and a shoulder 5b in FIG. 5B.

In the three embodiments shown in FIGS. 5A to 5C, the intermediate abutment part 4 of annular shape as shown in FIGS. 6A and 6B presents an optical fiber 3 adhesively bonded on its surface or embedded in its bulk so as to have a helical shape 3a in FIG. 6A or a sinusoidal shape 3b around the circumference of said part, as shown in FIG. 6B.

In FIG. 5A, the intermediate abutment part 4 is arranged against the underface of a top peripheral collar 5a. The top portion 6a of the inner cylindrical surface 6 of the buoy 2 presents a shape that is complementary to the assembly comprising the intermediate abutment part 4 and the rigid retaining part in the form of a collar 5a, so as to block any upward movement in translation of said buoy 2 relative to the pipe 1 around and against which it is mounted.

Likewise, in FIG. 5B, the intermediate abutment part 4 is mounted against the underface of the shoulder 5b, the cylindrical inside surface 6 of the buoy 2 presenting, in its middle portion facing the assembly of the shoulder 5b and the intermediate part 4a, a hollow complementary shape 6b that fits against and co-operates with the shape of the assembly comprising the intermediate part 4 and the shoulder 5b so as to block any upward movement in translation of the buoy 2 relative to the pipe 1 and so as to compress the intermediate abutment part 4 under the effect of said thrust from the buoy 2.

FIG. 5C shows an embodiment in which the buoy 2 is fastened to the pipe 1 via a clamping element forming a steel ring 2a that is applied coaxially against the pipe 1 at the bottom end of a connection cone 2b located in the bottom portion of the buoy 2. The intermediate abutment part 4 of annular shape is compressed under the effect of the thrust of the buoy between the fastener part 2a and the bottom peripheral collar 5c having the intermediate abutment part 4 positioned against its bottom face.

In the three embodiments of FIGS. 5A to 5C, the intermediate abutment part 4 is thus compressed against a collar 5a or 5c or a shoulder 5b as a result of the thrust exerted by the buoy 2, and thus the height of the abutment part 4 increases in length as a result of its elasticity whenever thrust from the buoy decreases.

In FIG. 5B, the shape of the setback 6b in the inside surface of the central cavity 6 of the buoy allows the part 4 to be deformed in this way over time by leaving an initial space 6c above the shoulder 5b.

When optical fibers are put into place on the buoys 2 or the intermediate abutment part 4, the optical fibers 3 may be positioned on an outside surface, or preferably they may be embedded in the material constituting the buoy 2 or the intermediate part 4.

FIGS. 4A and 4B show an embodiment in which three optical fibers 3d are adhesively bonded directly on the outside surface of the pipe 1 or are embedded in a thermoplastic surface coating of the pipe 1, the fibers 3d being arranged in straight lines in the longitudinal direction of the pipe and being arranged at the vertices of a triangle in cross-section. These straight fibers 3d may be capable of following elongation deformation of said steel pipe 1, thereby serving to measure variation in the thrust from the buoy in the absence of optical fibers on the buoys 2 or the intermediate parts 4.

Nevertheless, the straight optical fibers 3d arranged on the pipe 1 or on an abutment 2 are used in addition to the fibers 3a, 3b applied on or in the intermediate part 4. When the optical fiber 3 is arranged continuously on the pipe only, or on the pipe 1 and on the buoy 2 or the intermediate abutment part 4, given the return time of the signal and knowing the speed of light (of the laser signal), and knowing the helical pitch or the period of the sinusoid (if the fiber is laid helically or sinusoidally), it is possible to determine the location of a deformation of the fiber.

Also advantageously, at least one rectilinear fiber 3d on the pipe 1 serves as a transmission umbilical that is connected to the fibers 3a, 3b that are applied on or in the intermediate abutment part 4.

FIG. 7A shows an embodiment in which the buoy 2 is made up of two semicylindrical half-shells 2d, only one of which is shown, the two half-buoys being fastened against each other and against the pipe 1 by a clamping belt 7 received in an outer peripheral groove 7a in the buoy. The optical fiber 3, 3a-3b is embedded in the bulk of the elastically deformable intermediate abutment part 4 of annular shape. The intermediate abutment part 4 (three-quarters shown in FIG. 7A) is arranged against the underface of a middle annular rigid retaining part 5d, e.g. made of steel and forming a fitted shoulder. The rigid retaining part 5d may itself be made up of two semicylindrical retaining half-parts that are fitted and fastened against each other and against the pipe 1 by a belt or clamp 8 in an outer peripheral groove 8a of said annular rigid retaining part that is made of steel (for example). FIG. 7B shows the cylindrical inner wall 6b of the central cavity 6 of shape complementary to the assembly comprising the retaining part 5d and the deformable intermediate abutment part 4. FIG. 7C shows a semicylindrical retaining half-part 5d, a belt portion 8, a portion of an intermediate part 4, and a helical fiber 3a or a sinusoidal or undulating or zigzag fiber 3b that is extended by two rectilinear fibers 3b running along the pipe 1 in order to go respectively to the buoy above and to the buoy below. It should be observed in FIGS. 5B-5C and FIG. 7A, that the resilient abutment part 4 is shown in its position of maximum extension so that the assembly of the parts 4 and 5 occupies all of the internal space in the portion 6b of cylindrical shape of the axisymmetric central inner cavity 6 of the buoy. Furthermore, the conical top and bottom portions 6-1 and 6-2 of said cavity 6 serve in this example to accommodate bending of the pipe inside the buoy 2 in the event of it being curved as shown in FIG. 1.

Each of the floats 2 may be secured independently to the pipe and may be coaxial with the pipe, as shown in the figures. However, it is also possible for them to be constituted by pluralities of floats. The optical signal may be measured equally well using Bragg grating fibers or non-coaxial Brillouin diffusion fibers, but that are fixed on buoyancy modules and/or that form coaxial buoyancy modules that are themselves fastened coaxially around the pipe.

The optical signal may be measured equally well using Bragg grating fibers or Brillouin diffusion fibers. The optical fiber of each buoy 2 or intermediate part 4 may be connected to a single main fiber running along the pipe in order to return information from all of the buoys to a laser transceiver and measuring device that is generally located at the surface.

If each buoy 2 or intermediate abutment part 4 has its own network of optical fibers 3 and is connected independently of the other buoys (without being connected to the pipe), it is possible to make connections in turn between a common optical signal transmission umbilical and each of the buoys or the intermediate abutment parts 4. Otherwise, an umbilical specific to each buoy or each intermediate abutment part 4 is used for connecting and recovering deformation information from the various fibers on the various buoys or intermediate abutment parts. Finally, if the buoy is made up of a plurality of elements (e.g. two buoy half-modules), it is necessary to use at least one fiber per element.

When it is deformation of the buoy that is measured directly by means of the deformation of a fiber on the buoy, the deformation is due to the volume of the buoy diminishing over time (because of the degradation of the buoy).

When installing an optical fiber 3 in a said intermediate abutment part 4 between the buoy 2 and the retaining part 5, in particular when the part 4 is made of rubber, the optical fiber is preferable embedded in the resilient material of said intermediate abutment part and deformation is preferably measured using Bragg grating fibers, since the deformation is very localized, even though it is possible to apply Brillouin measurement.

When placing optical fiber on the pipe, in particular when there are a plurality of buoys 2 in a string, the optical fibers are adhesively bonded to the steel at the surface of the pipe, or they are adhesively bonded on or embedded in the anticorrosion thermoplastic coating of the pipe, if any. The lengthening of the pipe due to the traction exerted by the thrust from the buoy can be measured by the fiber. Deformation is preferably measured by a Brillouin measurement since the measurement is not local but is a measurement of overall deformation over a length of pipe. The fiber may be placed on the pipe in a straight line or helically, and specifically it is the deformation (elongation) of the pipe that is measured, specifically the element receives an ever decreasing "pull" over time from the buoy as a result of the thrust from the buoy diminishing over time. If the fiber is laid in a rectilinear manner or as a helix on the pipe or in a coating, it is preferably to install a plurality of fibers in order to have measurement redundancy, and in order to determine the elongation at various positions on the circumference of the pipe.

The fibers may be embedded in (or adhesively bonded on) any material that is deformable as a function of variation in thrust from the buoy. The buoys are generally made of PU or PP foam or syntactic foam, and the intermediate part is preferably made of an elastomer material such as rubber, however any other suitable deformable rigid material or any other elastic material may be appropriate for the intermediate abutment part.

Likewise, concerning laying on the pipe, the pipe is generally made of steel, but any other rigid composite or synthetic material that is deformable in elongation under the traction conditions involved is possible (possibly using an anticorrosion or insulating coating).

The intermediate abutment part 4 has more or less the same outside diameter as the collar 5a, 5c or the shoulder 5b of the pipe against which it is applied, i.e. in practice a dimension corresponding to extra thickness in the radial direction relative to the pipe lying in the range 5 mm to 50 mm for a pipe having a diameter lying in the range 10 centimeters (cm) to 50 cm. Likewise, the intermediate abutment part 4 has more or less the same dimension along the first axis, i.e. specifically the vertical axis or the longitudinal axis of the cylindrical buoy, i.e. in practice 5 mm to 50 mm, so that the variations in the thrust force transmitted from the buoy and/or the intermediate part 4 against said rigid retaining part 5 and/or the pipe 1 are large enough to be measurable.

The invention claimed is:

1. A method of monitoring variation over time in the thrust exerted by at least one buoy mounted on an undersea bottom-to-surface connection pipe and exerting traction on said pipe, the method comprising:
   1) measuring the deformation of at least one optical fiber by measuring variation of an optical signal in the optical fiber relative to a reference value for the optical signal, said optical fiber extending at least in part in a direction having a component parallel to the direction of the thrust force exerted by said buoy on said pipe, said optical fiber being securely applied against the surface by adhesive, said abutment part being an elastically deformable intermediate abutment part arranged between i) a portion of the buoy and ii) a rigid retaining part secured to said pipe, the thrust exerted by said buoy comprising said intermediate abutment part; and
   2) determining a variation in said thrust exerted by said buoy as a function of said variation of the optical signal as measured in step 1) relative to a reference value for the optical signal corresponding to a maximum initial thrust from the buoy.

2. The method according to claim 1, wherein said optical fiber is arranged in or at the surface of a said abutment part, which is an elastically deformable intermediate abutment part, made of elastomer material, said buoy being pressed against the initially compressed intermediate part, and a reduction in the thrust from the buoy over time is determined by elastic expansion of said intermediate part resulting from a decrease in the compression and a variation in the volume of the intermediate abutment part, said buoy being made of a buoyant material that is more rigid than the material of the intermediate abutment part and that is not subjected to elongation deformation in the event of degradation giving rise to a decrease in the thrust exerted by said buoy.

3. The method according to claim 2, wherein said central cavity in the buoy having the pipe passing therethrough presents a wall portion of shape complementary to the shape of said rigid retaining part and suitable for blocking movement in translation of the buoy in the longitudinal direction of the pipe.

4. The method according to claim 1, wherein said buoy is of part cylindrical or pseudo-cylindrical shape arranged coaxially around the pipe.

5. The method according to claim 4, wherein said rigid retaining part is constituted by a top peripheral collar made of steel surrounding said pipe and serving to hold in position said buoy arranged coaxially around the pipe and under said collar, said intermediate abutment part of annular shape being arranged coaxially against the underface of said rigid retaining part.

6. The method according to claim 4 wherein said rigid retaining part is constituted by a bottom peripheral collar made of steel surrounding said pipe and serving to hold in position said buoy arranged axially around the pipe and above said collar, said intermediate abutment part of annular shape being arranged coaxially against the underface of said rigid retaining part.

7. The method according to claim 4 wherein said rigid retaining part is constituted by a steel shoulder at the surface of the pipe, with the assembly of said shoulder and of said intermediate abutment part of annular shape arranged coaxially against the underface of said rigid retaining part cooperating with a complementary hollow shape in an inside surface of the central cavity of said buoy facing the outside surface of the pipe, said shoulder serving to hold in position said buoy arranged coaxially around the pipe and said shoulder.

8. The method according to claim 1 wherein the fiber extends helically and coaxially on the surface of or inside said abutment part.

9. The method according to claim 1, wherein the optical fiber extends sinusoidally or in undulations or as a zigzag around at least a portion of the circumference.

10. The method according to claim 1, wherein the optical fiber extends over a toroidal surface by winding the fiber on a virtual toroidal surface or on a toroidal support of diameter less than the thickness of said abutment part, the toroidal surface being embedded in said intermediate abutment part.

11. The method according to claim 1, wherein step 1), the deformation of at least one optical fiber is measured by using at least Brillouin backscattering or a Bragg grating optical fiber, by measuring variation in the frequency of the backscattered wave or respectively variation in the wavelength of the reflected wave from the optical signal reflected in the optical fiber compared with a reference value for the optical signal of the backscattered wave or respectively of the reflected wave.

12. A bottom-to-surface connection installation suitable for use in a method according to claim 11, wherein the installation being characterized in that it comprises a bottom-to-surface connection undersea pipe fitted with at least one buoy exerting traction on said pipe, and at least one optical fiber suitable for measuring deformation of the pipe by measuring variation of an optical signal in the optical fiber relative to a reference value for the optical signal, said optical fiber extending at least in part in a direction having a component parallel to the direction of the thrust force exerted by said buoy on said pipe, said optical fiber being securely applied against the surface, preferably by adhesive or preferably being securely embedded in the bulk of a material constituting at least an abutment part secured to said pipe or to the buoy and against which said buoy exerts said thrust, said abutment part being an elastically deformable intermediate abutment part arranged between i) a portion of the buoy and ii) a rigid retaining part secured to said pipe, the thrust exerted by said buoy compressing said intermediate abutment part; and said optical fiber is connected to an optical fiber conveying the optical signal.

13. An installation according to claim 12, wherein a plurality of said buoys of part cylindrical or pseudo-cylindrical shape are arranged one after another or spaced apart in a string coaxially around the pipe, and at least one optical fiber for measuring the respective thrusts from each of the buoys.

14. An installation according to claim 12, wherein the each buoy is constituted by a plurality of buoy elements suitable for being arranged facing each other so as to surround the pipe.

15. The installation according to claim 12, wherein the buoy has at least one optical fiber arranged in or at the surface of a said elastically deformable intermediate abutment part that is of annular shape and made of elastomer material, the thrust exerted by said buoy compressing said intermediate abutment part, said portion of said central cavity of the buoy presenting a shape that is complementary to the shape of the assembly of said abutment part and said rigid retaining part suitable for blocking movement of the buoy in translation along the longitudinal direction of the pipe.

16. The installation according to claim 15, wherein said buoy is applied against the initially compressed intermediate part, said buoy being made of a buoyant material that is more rigid than the material of said intermediate abutment part and that is not deformed in elongation in the event of degradation that gives rise to a decrease in the thrust exerted by said buoy.

17. The installation according to claim 12, wherein the optical fiber(s) of various said abutment parts of a plurality of buoys in series or in a string is/are connected in series and to a common umbilical for transmitting optical signals to an optical signal transceiver and measuring device.

* * * * *